(12) United States Patent
Pederson et al.

(10) Patent No.: US 7,438,137 B2
(45) Date of Patent: Oct. 21, 2008

(54) METHOD AND APPARATUS FOR LOCKING A WING FRAME OF AN IMPLEMENT

(75) Inventors: Nicholas Dean Pederson, Hill City, MN (US); William Allan Wake, Deer River, MN (US); Jacob N. Gust, Fargo, ND (US); Richard Allen Brunelle, Fargo, ND (US); Patrick L. Fisher, Bismark, ND (US)

(73) Assignee: CNH America LLC, Racine, WI (US)

( * ) Notice: Subject to any disclaimer, the term of this patent is extended or adjusted under 35 U.S.C. 154(b) by 504 days.

(21) Appl. No.: 11/226,632

(22) Filed: Sep. 14, 2005

(65) Prior Publication Data
US 2007/0056755 A1    Mar. 15, 2007

(51) Int. Cl.
*A01B 49/00* (2006.01)
(52) U.S. Cl. .................................. 172/311; 172/452
(58) Field of Classification Search ............... 292/95, 292/102; 172/311, 439, 440, 452, 677–680, 172/776
See application file for complete search history.

(56) References Cited

U.S. PATENT DOCUMENTS

| 2,056,006 | A |   | 9/1936  | Hodgkins |
|-----------|---|---|---------|----------|
| 2,868,482 | A |   | 1/1959  | Westcott, Jr. |
| 3,814,191 | A |   | 6/1974  | Tilbury |
| 4,078,779 | A |   | 3/1978  | Molders |
| 4,136,743 | A | * | 1/1979  | van der Lely ............ 172/49.5 |
| 4,324,296 | A |   | 4/1982  | Schenk et al. |
| 4,492,386 | A | * | 1/1985  | Roberts ..................... 280/507 |
| 4,609,202 | A |   | 9/1986  | Miyakoshi et al. |
| 4,629,167 | A |   | 12/1986 | Kimura et al. |
| 4,660,654 | A |   | 4/1987  | Wiebe et al. |
| 4,723,765 | A |   | 2/1988  | Pearson |
| 4,845,905 | A |   | 7/1989  | Frank |
| 4,973,097 | A |   | 11/1990 | Hosan et al. |
| 5,020,835 | A | * | 6/1991  | Poe ............................ 292/127 |
| 5,518,223 | A |   | 5/1996  | Bivens |
| 5,540,138 | A |   | 7/1996  | Robbins, Jr. |
| 5,647,578 | A |   | 7/1997  | Bivens |
| 5,657,969 | A |   | 8/1997  | Bivens |

(Continued)

Primary Examiner—Thomas B Will
Assistant Examiner—Jamie L McGowan
(74) Attorney, Agent, or Firm—Rebecca Henkel

(57) ABSTRACT

A method and apparatus for use with an agricultural implement assembly that includes a support frame, a wing frame and a cylinder assembly that includes a cylinder and a rod, each of the support frame, wing frame, cylinder and rod being an assembly component, the rod moving relative to the cylinder between an unlatched position and a latched position as the support and wing frames move from an operating position toward a transport position, the apparatus comprising a first coupler supported by one of the assembly components and moving along a pathway as the wing frame moves from the operating position toward the transport position, a second coupler supported at least in part within the pathway by at least another of the assembly components, the second coupler operable to couple with the first coupler when the rod is in the latched position and a latch inhibiting member that is manually moveable between a latch inhibiting position and a latch enabling position, when in the inhibiting position, the inhibiting member inhibiting coupling between the first and second couplers so that rod movement with respect to the cylinder along the pathway is unrestricted by the couplers.

12 Claims, 6 Drawing Sheets

U.S. PATENT DOCUMENTS

| | | |
|---|---|---|
| 5,741,007 A | 4/1998 | Witt |
| 5,913,369 A * | 6/1999 | Bodie et al. .................. 172/311 |
| 6,279,982 B1 | 8/2001 | White et al. |
| 6,422,322 B1 * | 7/2002 | Hoffart ....................... 172/439 |
| 6,733,225 B1 * | 5/2004 | Barnett et al. ............... 414/420 |

* cited by examiner

METHOD AND APPARATUS FOR LOCKING A WING FRAME OF AN IMPLEMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to apparatus for use on mobile machines with laterally extending devices and more specifically to mobile agricultural machines that have wing frame tool bars arranged in pivotally connected sections wherein one or more of the sections can be pivoted upward away from the ground to an elevated transport position.

Various mobile machines, especially mobile agricultural machines, include earth working implements arranged on laterally extending tool bars or wing frames. To accommodate transportation of such a machine along a highway, means are provided for pivotally swinging or folding one or more of the wing frames upwardly from a lowered ground-engaging operating position to a raised, inactive transport position.

Various conventional or non-conventional actuators may be employed to raise the wing frames. Once the wing frames are raised to the inactive transport position, mechanical or hydraulic locking systems are engaged to prevent the inadvertent lowering of the wing frames. For example, wing frames are typically raised with hydraulic actuators. In such a situation hydraulic fluid leakage in the valves, seals, lines, fittings or other places have been known to permit the weight of the wing frames, or other imposed forces, to cause the wing frames to be lowered in the absence of locking systems.

Mechanical wing frame locking systems typically require that the operator raise the wing frame by operating the controls on the machine, dismount the machine and walk to the wing frame, insert a locking pin to secure each wing frame to a portion of the main frame, and then mount the machine again.

In addition to the disadvantages inherent in this labor intensive process, it is possible for the operator to forget or purposefully decide not to carry out the wing frame locking process altogether to save time. Further, even if the wing frames are properly locked in the raised positions, it is possible for the operator to forget to remove the locking pins before operating the actuators to lower the wing frames. This can cause damage to the machinery.

Attempts to overcome the disadvantages of mechanical locking pin systems for maintaining wing frames in the raised transport positions have involved the use of automatically operated lock-up systems employing hydraulic actuators. Such lock-up systems are expensive, requiring the use of additional hydraulic piston-cylinder actuators, valves, and hoses.

Other attempts to overcome the disadvantages of mechanical locking pin systems for maintaining wing frames in the raised transport positions and for automatically decoupling wing frames when the frames are to be lowered have involved modifying several of the system components including, for instance, adding features to the wing frames, adding complex linkage components between the cylinders and the wing frames, etc. While these solutions work in theory, these solutions often increase overall costs as modifications to several components and additional components are required.

In addition, in at least some cases, these solutions require relatively complex linkages that require additional maintenance and are prone to malfunction. For instance, in at least some of these cases mechanical interaction between relatively small components is required to transfer forces along specific trajectories where the relative movements of components can be hampered or even blocked by field debris that becomes lodged between adjacent components.

BRIEF SUMMARY OF THE INVENTION

At least some inventive embodiments include an apparatus for use with an agricultural implement assembly that includes a trailer frame, a wing frame and a cylinder assembly that includes a cylinder and a rod, each of the trailer frame, wing frame, cylinder and rod being an assembly component, the cylinder linked to a first of the trailer frame and the wing frame and the rod linked to a second of the trailer fame and the wing frame, the rod moving relative to the cylinder between an unlatched position and a latched position as the first component moves with respect to the second component between an operating position and a transport position, the apparatus for selectively limiting rod movement when the rod is in the latched position. Here, in some cases the apparatus includes a first coupler supported by one of the assembly components and moving along a pathway as the wing frame moves from the operating position toward the transport position;, a second coupler supported at least in part within the pathway by at least another of the assembly components, the second coupler operable to couple with the first coupler when the rod is in the latched position and a latch inhibiting member mounted to one of the assembly components, the inhibiting member proximate at least one of the first and second couplers when the rod is in the latched position and manually moveable between a latch inhibiting position and a latch enabling position, when in the inhibiting position, the inhibiting member inhibiting coupling between the first and second couplers so that rod movement with respect to the cylinder along the pathway is unrestricted by the couplers.

In some embodiments the at least one of the first and second couplers includes a latch member and the other of the first and second couplers includes a catch member, the latch member mounted for movement between a latching position and an unlatching position, the latch and catch couplers coupled when the rod is in the latched position and the latch member is in the latching position and decoupled when the latch member is in the unlatched position, the inhibiting member manually operable to support the latch member in the unlatched position when the inhibiting member is in the inhibiting position.

In some cases the latch member includes proximal and distal ends and is mounted at the proximal end for pivotal movement, the distal end forming a cavity, when the rod is in the latching position and the inhibiting member is in the enabling position, a first catch member section is received within the cavity to limit extension of the cylinder assembly. In some cases the distal end of the latch member also forms a ramp surface and, as the rod moves toward the latched position, the catch member contacts the ramp surface and forces the latch member toward the unlatching position until the catch member is aligned with the cavity. In some cases the latch member is mounted for pivotal movement about a generally horizontal first axis and the cavity opens downwardly so that gravity tends to force the latch member into the latching position.

In some embodiments the inhibiting member includes a rigid member that is mounted to the distal end of the latch member proximate the cavity for pivotal movement between the inhibiting and enabling positions and the inhibiting member forms a bearing surface that bears against the catch member to maintain the inhibiting member in the inhibiting position when the rod is in the latched position. In some embodiments the inhibiting member also forms a second ramp surface that resides in the pathway as the rod member moves toward the latched position, the catch member contacting the second ramp surface as the rod moves toward the latched position and forcing the inhibiting member toward the enabling position.

In some cases the first and second ramp surfaces include lower distal ends and wherein the lower distal end of the second ramp surface extends below the lower distal end of the first ramp surface. In some cases the at least one of the bearing surface and the catch member forms a recess for receiving the other of the bearing surface and the catch member.

In some other embodiments the first and second couplers are supported by opposite ends of the rod and the cylinder, respectively. In some cases the first coupler includes a first pin member that links a distal end of the rod member to the wing frame and the second coupler includes a latch member mounted via a second pin to the cylinder for pivotal movement between a latching position and an unlatching position, a distal end of the latch member forming a cavity for receiving a portion of the first pin when the rod is in the latched position.

In some cases the at least one of the first and second couplers includes a latch member moveable between a latching position and an unlatching position and the inhibiter member includes a rigid member supported by one of the first and second couplers for pivotal movement between the inhibiting and enabling positions. In some cases the inhibiting member includes a ramp surface located within the pathway when the rod is moving toward the latched position, the first coupler contacting the ramp surface and forcing the inhibitor toward the enabling position as the rod moves toward the latched position.

In some embodiments the second member is a latch member that is pivotally mounted for movement between a latching position and an unlatching position and wherein gravity tends to force the latch member into the latching position and the inhibiting member is useable to maintain the latch member in the unlatching position.

Some embodiments include an apparatus for use with an agricultural assembly that includes a wing frame that moves with respect to a support frame, the apparatus for selectively limiting relative movement of the wing frame with respect to the support frame and comprising a cylinder assembly including a cylinder and a rod where the rod moves with respect to the cylinder between an unlatched extended position and a latched retracted position, the cylinder assembly including opposite first and second ends at opposite ends of the rod and cylinder, respectively, a catch member supported at the first end of the cylinder assembly that moves along a pathway as the rod moves toward the retracted position, the catch member forming a first bearing surface, a latch member including proximal and distal ends, the distal end forming a cavity along a first edge, the latch member linked at the proximal end to the second end of the cylinder assembly for pivotal movement between a latching position and an unlatching position and an inhibiting member including a rigid member forming a second bearing surface, the inhibiting member mounted for pivotal movement to the distal end of the latch member proximate the cavity for movement between an inhibiting position and an enabling position such that, with the rod in the latched position, when the inhibiting member is in the enabling position, at least a portion of the catch member is received in the cavity and when the inhibiting member is in the enabling position, the second bearing surface bears against the first bearing surface and maintains the catch member outside the cavity.

In some cases the latch member also forms a first ramp surface and wherein, when the rod is in the extended position, the first ramp surface is located at least in part in the pathway such that as the rod moves toward the retracted position along at least a portion of the pathway, the catch member contacts the ramp surface and forces the latch member toward the unlatching position until the catch member is aligned with the cavity. In some cases the inhibiting member includes a second ramp surface and wherein, when the rod is in the extended position, the second ramp surface is located at least in part in the pathway such that as the rod moves toward the latched position along at least a portion of the pathway, the catch member contacts the second ramp surface and forces the inhibiting member toward the enabling position such that, once the catch member is received within the cavity, the inhibiting member is in the enabling position. In some cases the latch member is manually rotatable from the latching position to the unlatching position.

In some cases, when the latch member is moved to the unlatching position, the inhibiting member pivots into the inhibiting position to maintain the latch member in the unlatching position until the rod is moved from the latched position.

Still other embodiments include a method for use with an agricultural implement assembly that includes a trailer frame, a wing frame and a cylinder assembly that includes a cylinder and a rod, each of the trailer frame, wing frame, cylinder and rod being an assembly component, the cylinder linked to a first of the trailer frame and the wing frame and the rod linked to a second of the trailer fame and the wing frame, the rod moving relative to the cylinder between an unlatched position and a latched position as the first component moves with respect to the second component between an operating position and a transport position, the method for selectively limiting rod movement when the rod is in the latched position, the method comprising the steps of providing a first coupler supported by one of the assembly components and moving along a pathway as the wing frame moves from the operating position toward the transport position, providing a second coupler supported at least in part within the pathway by at least another of the assembly components, the second coupler operable to couple with the first coupler when the rod is in the latched position and providing a latch inhibiting member mounted to one of the assembly components, the inhibiting member proximate at least one of the first and second couplers when the rod is in the latched position and manually moveable between a latch inhibiting position and a latch enabling position, when in the inhibiting position, the inhibiting member inhibiting coupling between the first and second couplers so that rod movement with respect to the cylinder along the pathway is unrestricted by the couplers.

In addition, at least some embodiments include an apparatus for use with an agricultural implement assembly that includes first and second members and a cylinder assembly that includes a cylinder and a rod, each of the first member, second member, cylinder and rod being an assembly component, the cylinder linked to one of the first and second members and the rod linked to the other of the first and second members, the rod moving relative to the cylinder between an unlatched position and a latched position as the one of the members moves with respect to the other of the members between first and second positions, the apparatus for selectively limiting rod movement when the rod is in the second position, the apparatus comprising a first coupler supported by one of the assembly components and moving along a pathway as the second member moves from the second position toward the first position, a second coupler supported at least in part within the pathway by at least another of the assembly components, the second coupler operable to couple with the first coupler when the rod is in the latched position and a latch inhibiting member mounted to one of the assembly components, the inhibiting member proximate at least one of the first and second couplers when the rod is in the latched position and manually moveable between a latch inhibiting position and a latch enabling position, when in the inhibiting position, the inhibiting member inhibiting coupling between the first and second couplers so that rod movement with respect to the cylinder along the pathway is unrestricted by the couplers.

In some cases at least one of the first and second couplers includes a latch member and the other of the first and second couplers includes a catch member, the latch member mounted for movement between a latching position and an unlatching position, the latch and catch couplers coupled when the rod is in the latched position and the latch member is in the latching position and decoupled when the latch member is in the unlatching position, the inhibiting member manually operable to support the latch member in the unlatched position when the inhibiting member is in the inhibiting position.

In some embodiments the latch member includes proximal and distal ends and is mounted at the proximal end for pivotal movement, the distal end forming a cavity, when the rod is in the latching position and the inhibiting member is in the enabling position, a first catch member section is received within the cavity to limit extension of the cylinder assembly.

DETAILED DESCRIPTION OF THE INVENTION

Figure 1:
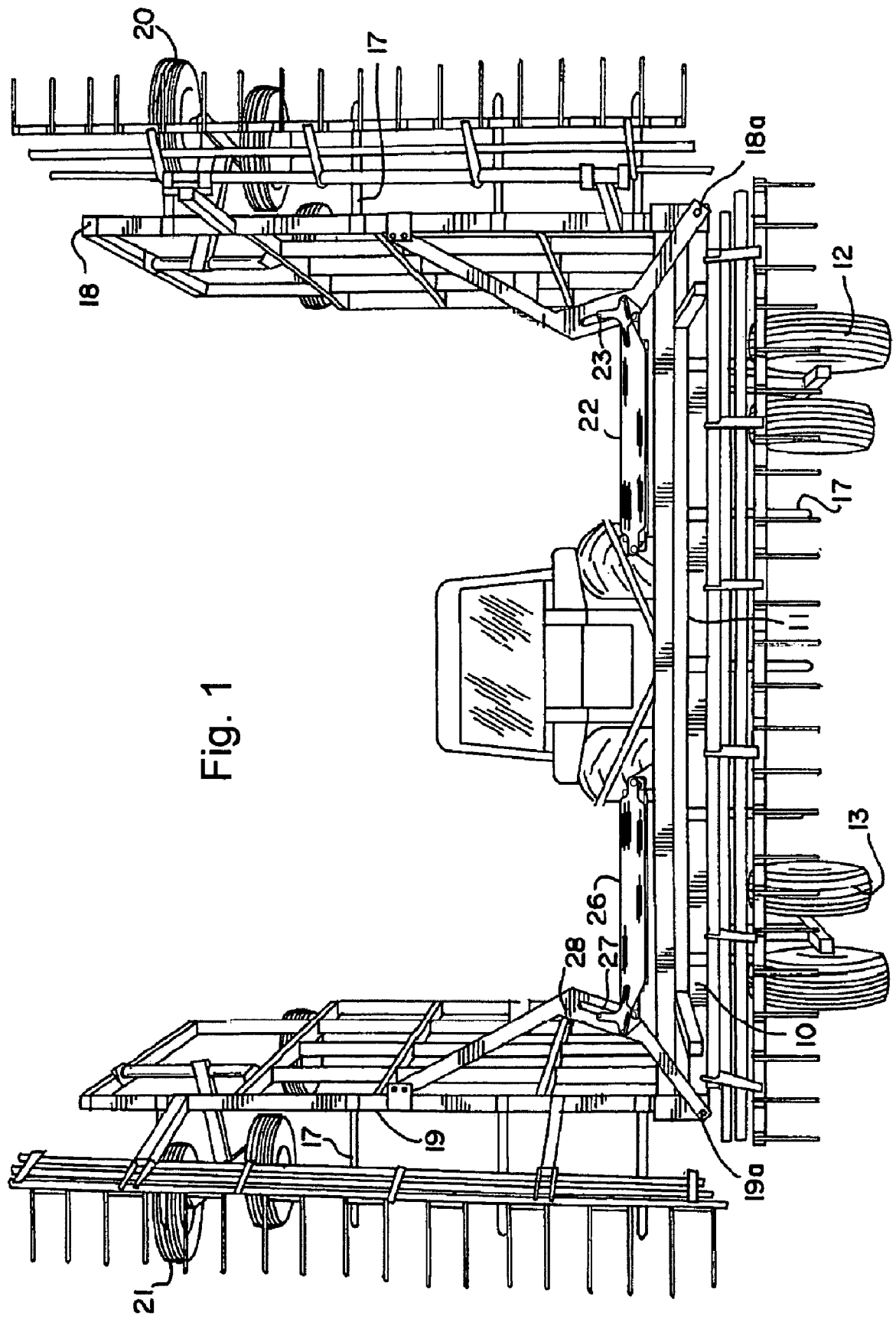
FIG. 1 is a rear perspective view of an agricultural implement attached to a tractor where the implement includes cylinder/latch assemblies for raising and lowering wing frames and for locking the wing frames in transport positions.

One or more specific embodiments of the present invention will be described below. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring now to the drawings wherein like reference numerals are used to refer to similar elements throughout the several views and, more specifically, referring to FIG. 1, the present invention will be described in the context of a multi-section implement which, in the illustrated embodiment, is a field cultivator. Cultivator 10 includes an elongated transverse support or trailer frame 11 located on two pairs of laterally offset bogie type ground wheels 12 and 13. Support frame 11 has a long forwardly extending draft tongue (not labeled or illustrated) for connection to a prime mover (e.g., a tractor) by any suitable means. Also mounted on support frame 11 are laterally spaced downwardly depending spring loaded tooth cultivator shanks 17.

Pivotally mounted via suitable hinges to each end of the support frame 11 (when standing to the rear of the implement and looking toward the tractor) is right wing section or frame 18 on pivot axis 18a having a pair of bogie type ground wheels 20 and tools 17 and left wing section or frame 19 on pivot axis 19a having bogie wheels 21 and tools 17. Double acting hydraulic cylinder/latch assembly 22 is pivotally connected to the rear of support frame 11 at the base end and pivotally connected to the right wing frame 18 at the rod end via upwardly extending slotted hole 23 in wing structure 24. Similar cylinder/latch assembly 26 is pivotally connected to support frame 11 at the base end and pivotally connected to left wing frame 19 at the rod end via slotted hole 27 in similar wing structure 28. In the working or operating position of the implement (not shown), the cylinders are extended and each wing frame, due to the slot orientation, can float over ground irregularities via the pivot axes without affecting the cylinders. In the folded or transport position of approximately 900 shown in FIG. 1, the rod end remains at the end of the slot.

Referring still to FIG. 1, each of cylinder/latch assemblies 22 and 26 is similarly constructed and operates in a similar fashion and therefore, in the interest of simplifying this explanation, only cylinder/latch assembly 26 will be described here in detail. It should suffice to say that automatic and manual operation of cylinder/latch assembly 22 for moving wing frame 18 between the transport position and operating position and for locking frame 18 in the transport position will be similar to that described below.

Referring still to FIG. 1 and also to FIGS. 2 through 6, cylinder/latch assembly 26 includes a cylinder assembly including cylinder 40 and rod 56, a cylinder support 50, first and second cylinder assembly pins 53 and 48, respectively, a latch or latch member 42, a latch inhibiting member 44, a stop pin 64 and a pivot pin 62. Cylinder support 50 includes rigid extension members that are mounted to a top surface 21 of support frame 11 and extend upward therefrom in a spaced apart fashion as illustrated. In top ends of the extension members that form support 50, each of the extension members forms a hole and the holes are aligned along a first generally horizontal axis 53 (see FIG. 3).

The cylinder assembly including cylinder 40 and rod 56 is mounted via pins 52 and 48 between cylinder support 50 and wing frame 28. To this end, cylinder 40 includes a proximal end 46 that forms a hole (not labeled or illustrated) that is aligned with the holes formed by cylinder support 50 and pin 52 is received therethrough such that proximal end 46 of cylinder 40 can rotate about horizontal axis 53. Similarly, rod 56 includes a distal end 54 that forms a hole that is aligned with slotted hole 27 formed by wing frame 28. Pin 48 is received through the hole formed at distal end 54 and the aligned slot 27 so that wing frame 28 can rotate about a second generally horizontal axis 57.

Figure 3:
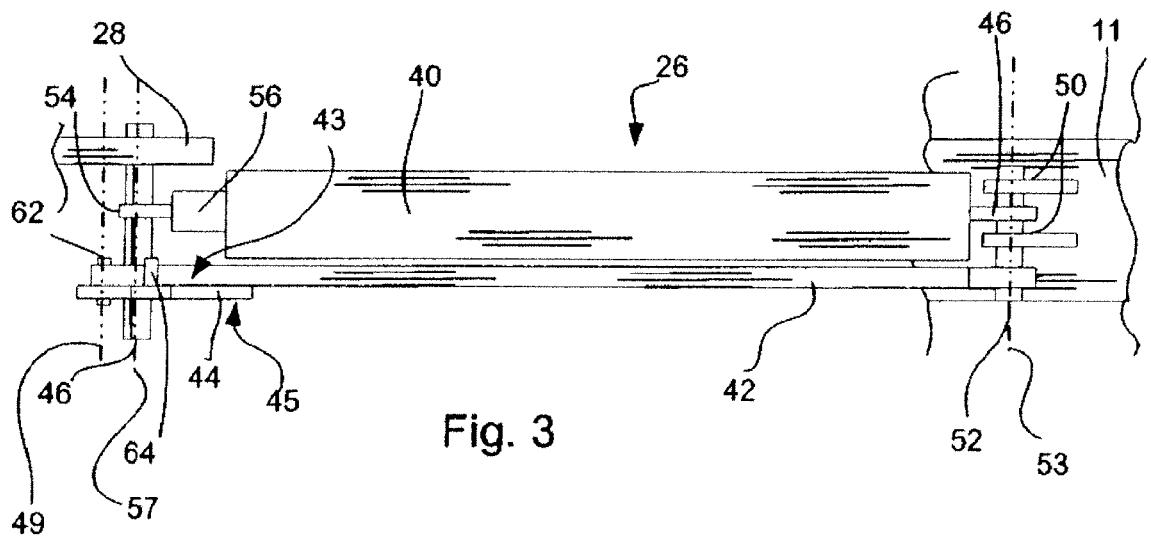
FIG. 3 is a top view of the cylinder/latch assembly of FIG. 2.
Figure 6:
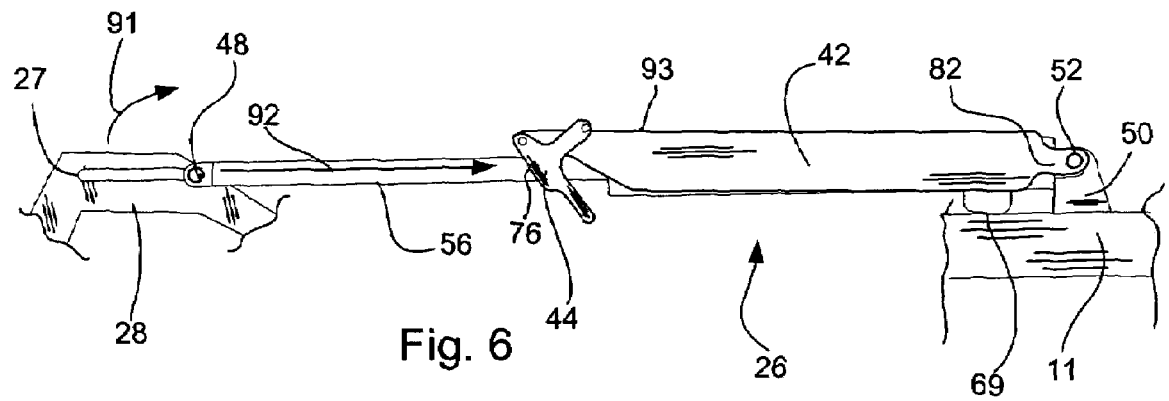
FIG. 6 is a similar to FIG. 2, albeit illustrating the cylinder/latch assembly where a rod is in an extended position.

As illustrated best in FIG. 3, each of pins 52 and 48 is relatively long and extends to one side of the cylinder assembly. When rod 56 is retracted, distal end 54 pulls wing frame 28 inward until the assembly mounted to frame 28 is generally horizontal as illustrated in FIG. 1. When in a fully retracted position, hereinafter, unless indicated otherwise, the position of the rod will be referred to as a "latched" position. Referring specifically to FIG. 6, when rod 56 is extended, wing frame 28 rotates through approximately 90° and the subassembly attached thereto is in a lowered operating position. Hereinafter, unless indicated otherwise, when rod 56 is fully extended, the position of rod 56 will be referred to as an "unlatched" position.

Figure 2:
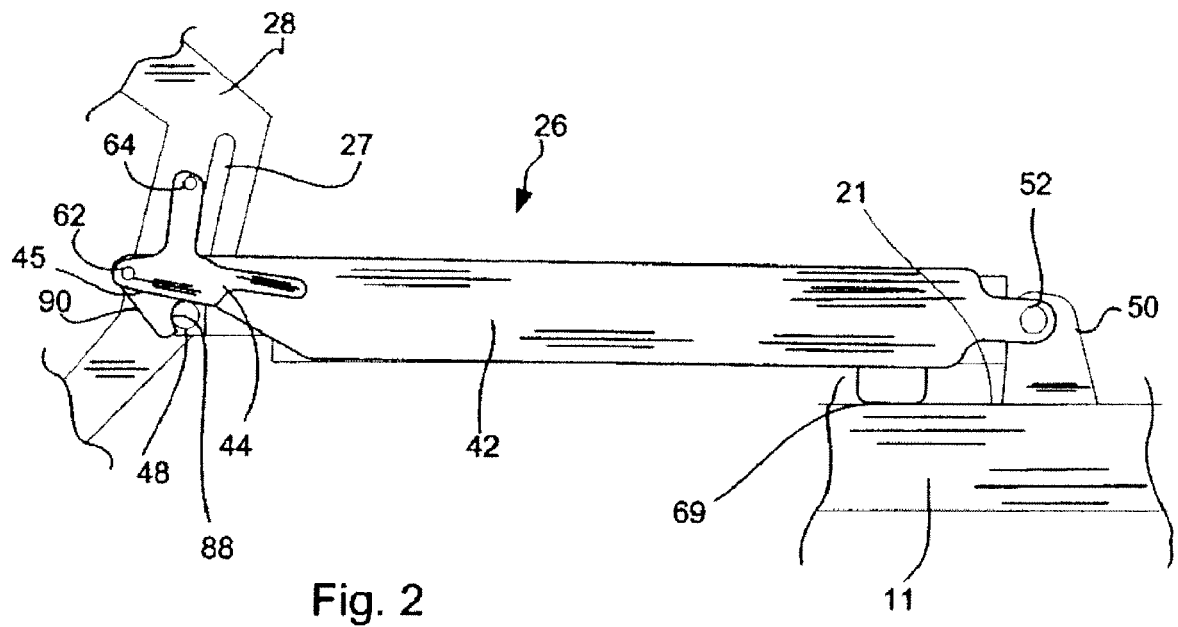
FIG. 2 is a is a schematic diagram of a side view of one of the cylinder/latch assemblies of FIG. 1.
Figure 4:
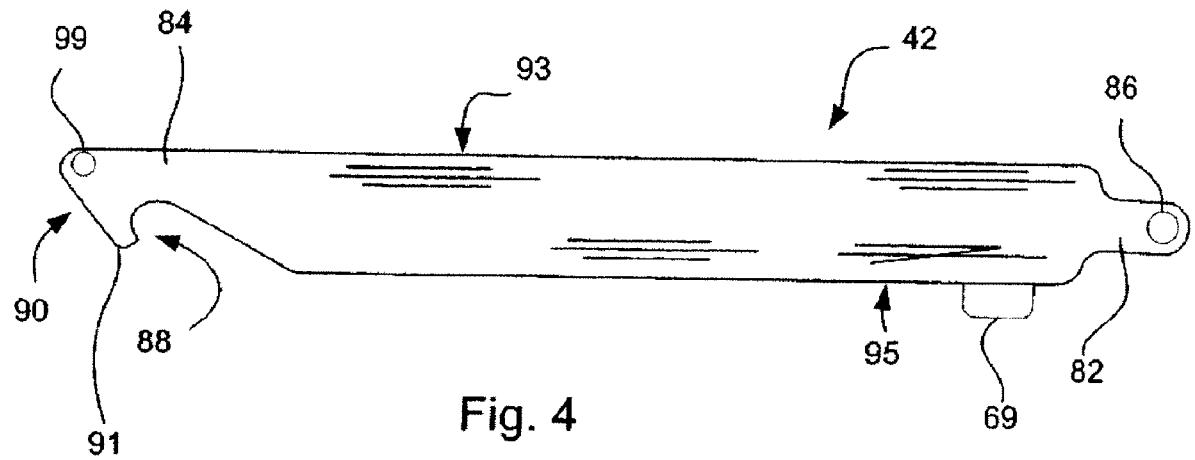
FIG. 4 is a side view of a latch member of FIG. 2.

Referring to FIGS. 2, 3 and 4, latch member 42 is an elongated rigid member having a proximal end 82, a distal end 84 and generally straight upper and lower parallel edges 93 and 95, respectively, that extend substantially along the length of member 42 between the proximal and distal ends 82 and 84, respectively. At proximal end 82, member 42 forms a hole sized to receive pin 52 (see FIG. 3). In addition, adjacent proximal end 82, a restricting member 69 extends downward from lower edge 95. The function of member 69 is described below. At distal end 84, member 42 includes three features that are of interest. First, member 42 forms a generally downwardly facing angled first ramp surface 90 at distal end 84. In the illustrated embodiment, when member 42 is installed as illustrated in FIG. 2, ramp surface 90 forms an approximately 45° angle with horizontal where edges 93 and 95 are generally horizontally aligned.

Second, member 42 forms a generally downwardly opening cavity at distal end 84 between first ramp surface 90 and the lower straight edge 95. As best illustrated in FIG. 2, latch member 42 has a length dimension such that the distance between hole 86 and cavity 88 is similar to the dimension between axis 53 and 57 when rod 56 is in the latched position (i.e., rod 56 is in the retracted position).

Third, latch member 42 forms a hole 99 at distal end 84 generally between first ramp surface 90 and a distal end of upper edge 93. In the illustrated embodiment, hole 99 has a diameter that is less than hole 86. The center of hole 99 forms a third axis 49 (see FIG. 3).

Figure 5:
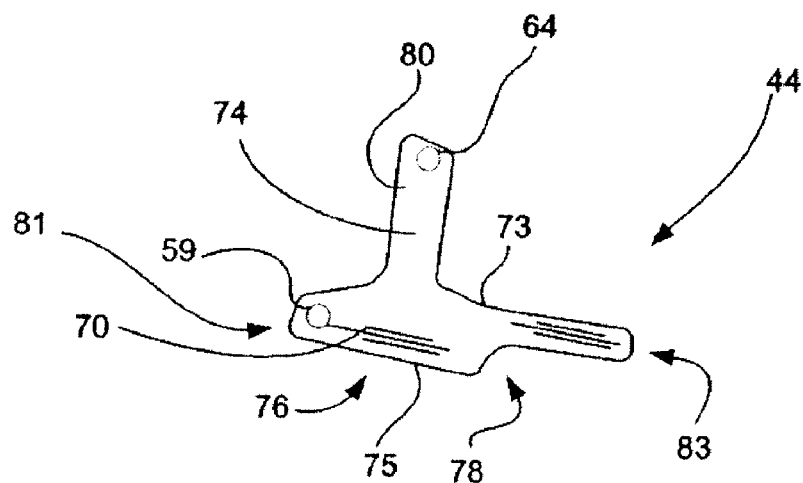
FIG. 5 is a side view of a latch inhibiting member of FIG. 2.

Referring now to FIGS. 2, 3 and 5, latch inhibiting member 44 is a rigid flat component having first and second flat and parallel surfaces 43 and 45, respectively. Member 44 includes a shoulder member 70 and an integrally formed arm member 74 that extends therefrom. More specifically, shoulder member 70 has oppositely directed proximal and distal ends 81 and 83 and first and second generally oppositely facing edges 73 and 75 that extend between proximal end 81 and distal end 83. Arm member 74 extends from first edge 73 about mid-way therealong and is substantially perpendicular thereto. Arm member 74 includes a distal end 80 opposite should member 70 and stop pin 64 extends perpendicular to arm member 74 proximate distal end 80 and away from first surface 43 (see specifically FIG. 3).

Second edge 75 includes a generally straight second ramp surface 76 at proximal end 81 that extends toward distal end 83. About mid-way along second edge 75 and adjacent second ramp surface 76, edge 75 forms a recess that extends toward first edge 73 where the recess forms a bearing surface labeled 78. At proximal end 81, should member 70 forms a hole 59 that has a diameter similar to the diameter of hole 99 formed by latch member 42.

Referring still to FIGS. 2 though 5, when assembled, pin 62 is passed through holes 59 and 99 in members 44 and 42, respectively, to secure latch inhibiting member 44 proximate distal end 84 of latch member 42 and to be pivotable about third axis 49. Here, member 44 is juxtaposed with respect to latch member 42 such that surface 43 faces and is adjacent to latch member 42 and so that stop pin 64 resides next to and can rest upon upper edge 93 of latch member 42 (see FIG. 3). C-type clamping washers (not illustrated) may be secured to opposite ends of pin 62 to maintain members 42 and 44 together. Next, the proximal end 82 of latch member 42 is mounted to pin 52 by sliding an end of pin 52 through hole 86. Again, a C-type clamping washer may be received on the distal end of pin 52 to ensure that proximal end 82 of latch member 42 remains journaled thereto. When so mounted, latch member 42 can rotate generally about axis 53 until mechanically restricted by other components (e.g., member 69 contacting surface 21, etc.).

Figure 7:
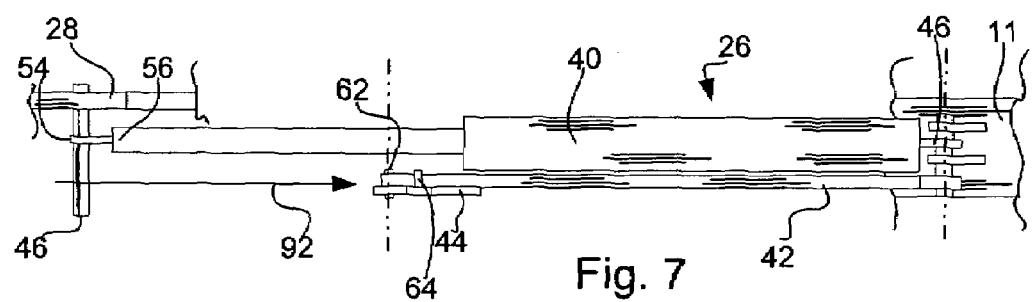
FIG. 7 is a top view of the assembly of FIG. 6 where the rod is in the extended position.

Referring now to FIGS. 6 and 7, with wing frame 28 in the lowered and operating position, rod 56 is in the extended or unlatched position as illustrated. Here, latch member 42 extends from proximal end 82 and cylinder support 50 along cylinder 40 and toward pin 48 while member 69 rests on top surface 21 of support frame 11. In addition, at this point, referring also to FIGS. 3 and 9, latch inhibiting member 44 is supported by pin 62 and a lower surface of pin 64 that is received on upper edge 93 of latch member 42. When so supported, as best illustrated in FIG. 9, ramp surface 76 is exposed at least slightly in front of the ramp surface 90 formed by latch member 42.

Figure 9:
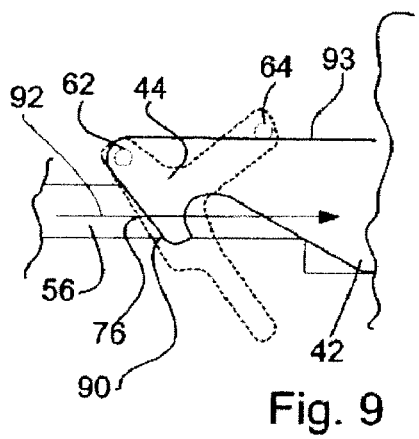
FIG. 9 is a an enlarged view of a distal end of the latch member and latch inhibiting member of FIG. 6 where the latch inhibiting member is shown in phantom.

Referring still to FIGS. 6, 7 and 9, to move wing frame 28 into the transport position as illustrated in FIG. 1, rod 56 is retracted such that pin 48 moves along the trajectory or pathway indicated by arrow 92 and frame 28 moves in the direction indicated by arrow 91. When pin 48 moves along pathway 92, each of latch member 42 and the latch inhibiting member 44 are aligned along the pathway 92 and ramp surfaces 76 and 90 are within the pathway.

Figure 8:
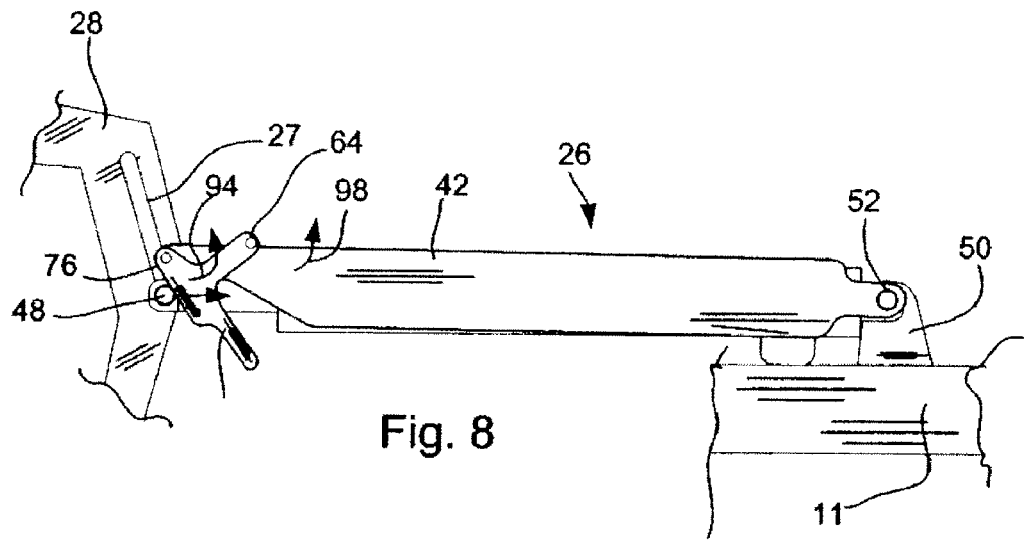
FIG. 8 is similar to FIG. 2, albeit illustrating the cylinder/latch assembly in an intermediate state.

Referring to FIG. 8, near the end of a retracting movement of rod 56, pin 48 contacts ramp surfaces 76 and 90 and forces associated members 44 and 42 to rotate upward as indicated by arrows 94 and 98, respectively. More specifically, first, because ramp surface 76 is exposed in front of ramp surface 90, ramp surface 76 is contacted and member 44 rotates through a small angle about axis 49. Second, pin 48 contacts ramp surface 90 and slides therealong forcing latch member 42 to rotate about axis 53 as indicated by arrow 98.

Figure 10:
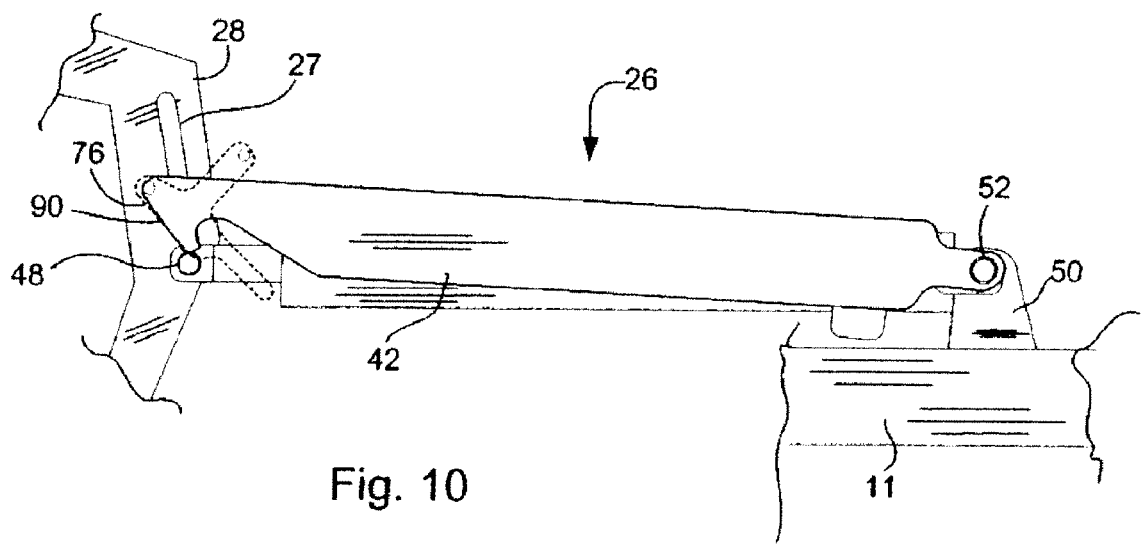
FIG. 10 is similar to FIG. 6, albeit illustrating another intermediate state.

Referring to FIG. 10, eventually, pin 48 reaches the lower distal end 91 of ramp surface 90. Note that, as illustrated in FIG. 10, ramp surface 76 of member 44 extends at least slightly lower than ramp surface 90 and therefore, pin 48 reaches the distal lower end 91 of ramp surface 90 prior to reaching the end of ramp surface 76. Eventually, as rod 56 is further retracted, pin 48 becomes aligned with cavity 88 and latch member 42, under the force of gravity, rotates downwardly such that pin 48 is received within cavity 88 as illustrated in FIG. 2. At this point, pin 48 and latch member 42 act as first and second couplers that lock wing frame 28 in a transport position so that rod 56 cannot be extended.

Figure 11:
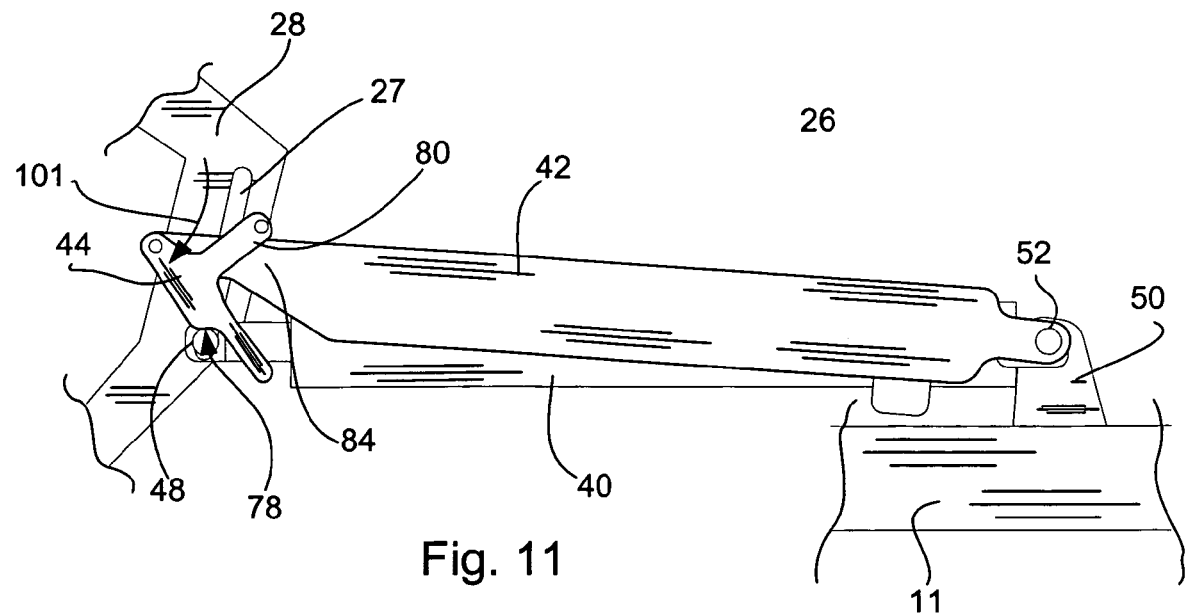
FIG. 11 is similar to FIG. 2, albeit illustrating a latch in an unlatching position and a latch inhibiting member in a deactivating position.
Figure 12:
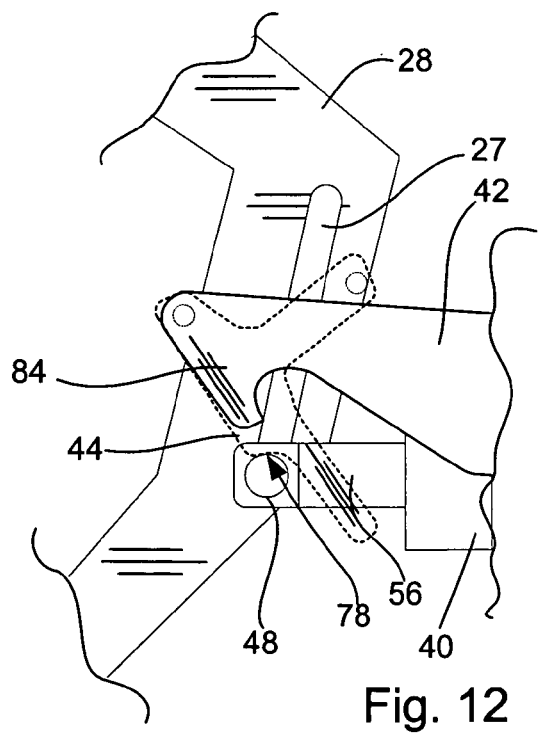
FIG. 12 is similar to FIG. 9, albeit illustrating the latch member and latch inhibiting member in the positions shown in FIG. 11 where the latch inhibiting member is shown in phantom.

Once implement assembly 10 has been moved to a field or other location where wing frame 28 should be lowered into the operating position, an implement user can dismount the tractor or other primary mover and walk back to cylinder/latch assembly 26. To unlock the cylinder, as illustrated in FIGS. 11 and 12, the operator can simply lift the distal end 84 of latch member 42 upward thereby allowing latch inhibiting member 44 to rotate about axis 49 in the direction indicated by arrow 101. As member 44 rotates in the direction indicated by arrow 101, pin 48 slides along ramp surface 76 until pin 48 reaches the end thereof at which point a bearing surface of pin 48 is received on bearing surface 78. At this point, member 44 becomes lodged between pin 62 and pin 48 and holds latch member 42 in the unlatched position shown in FIGS. 11 and 12. When rod 56 is next extended, pin 48 slips off bearing surface 78 at which point member 42, under the force of gravity, moves back down into the position (i.e., the latching position) illustrated in FIG. 6.

While the invention may be susceptible to various modifications and alternative forms, specific embodiments have been shown by way of example in the drawings and have been described in detail herein. However, it should be understood that the invention is not intended to be limited to the particular forms disclosed. For example, while the invention described above is one in which a cylinder assembly rod extends and retracts when a wing frame is in the operating and transport positions, respectively, it should be appreciated that other inventive embodiments are contemplated wherein the rod retracts and extends when the wing frame is in the operating and transport positions, respectively. Similarly, while the embodiment described above includes a latch member mounted to a proximal end of a cylinder that latches with a pin 48 at the distal end of a rod, it should be appreciated that other latching configurations are contemplated such as, for example, where the latch member may be mounted to the distal end of a rod and may latch with the pin mounted to the proximal end of a cylinder, where one or both of the latch member and pin or other couplers are directly supported by the support frame 11 and/or the wing frame 28, etc. In addition, latch inhibiting members having other general designs and configurations are contemplated.

Thus, the invention is to cover all modifications, equivalents, and alternatives falling within the spirit and scope of the invention as defined by the following appended claims. To apprise the public of the scope of this invention, the following claims are made.

What is claimed is:

1. An apparatus for use with an agricultural implement assembly that includes a trailer frame, a wing frame and a cylinder assembly that includes a cylinder and a rod, each of the trailer frame, wing frame, cylinder and rod being an assembly component, the cylinder linked to a first end of the trailer frame and the wing frame and the rod linked to a second end of the trailer fame and the wing frame, the rod moving relative to the cylinder between an unlatched position and a latched position as the wing frame moves with respect to the trailer frame between an operating position and a transport position, the apparatus for selectively limiting rod movement when the rod is in the latched position, the apparatus comprising:

a first coupler supported by one of the assembly components and moving along a pathway as the wing frame moves from the operating position toward the transport position;

a second coupler supported at least in part within the pathway by at least another of the assembly components, the second coupler operable to couple with the first coupler when the rod is in the latched position; and a latch inhibiting member mounted to one of the assembly components, the inhibiting member proximate at least one of the first and second couplers when the rod is in the latched position and manually moveable between a latch inhibiting position and a latch enabling position, when in the inhibiting position, the inhibiting member inhibiting coupling between the first and second couplers so that rod movement with respect to the cylinder along the pathway is unrestricted by the couplers wherein at least one of the first and second couplers includes a latch member and the other of the first and second couplers includes a catch member, the latch member mounted for movement between a latching position and an unlatching position, the latch and catch couplers coupled when the rod is in the latched position and the latch member is in the latching position and decoupled when the latch member is in the unlatched position, the inhibiting member manually operable to support the latch member in the unlatched position when the inhibiting member is in the inhibiting position;

wherein the latch member includes proximal and distal ends and is mounted at the proximal end for pivotal movement, the distal end forming a cavity, when the rod is in the latching position and the inhibiting member is in the enabling position, a first catch member section is received within the cavity to limit extension of the cylinder assembly;

wherein the distal end of the latch member also forms a ramp surface and, as the rod moves toward the latched position, the catch member contacts the ramp surface and forces the latch member toward the unlatching position until the catch member is aligned with the cavity;

wherein the latch member is mounted for pivotal movement about a generally horizontal first axis and the cavity opens downwardly so that gravity tends to force the latch member into the latching position;

wherein the inhibiting member includes a rigid member that is mounted to the distal end of the latch member proximate the cavity for pivotal movement between the inhibiting and enabling positions and the inhibiting member forms a bearing surface that bears against the catch member to maintain the inhibiting member in the inhibiting position when the rod is in the latched position;

wherein the inhibiting member also forms a second ramp surface that resides in the pathway as the rod member moves toward the latched position, the catch member contacting the second ramp surface as the rod moves toward the latched position and forcing the inhibiting member toward the enabling position.

2. The apparatus of claim 1 wherein the first and second ramp surfaces include lower distal ends and wherein the lower distal end of the second ramp surface extends below the lower distal end of the first ramp surface.

3. The apparatus of claim 1 wherein a least one of the bearing surface and the catch member forms a recess for receiving the other of the bearing surface and the catch member.

4. The apparatus of claim 1 wherein the first and second couplers are supported by opposite ends of the rod and the cylinder, respectively.

5. The apparatus of claim 4 wherein the first coupler includes a first pin member that links a distal end of the rod member to the wing frame and the second coupler includes a latch member mounted via a second pin to the cylinder for pivotal movement between a latching position and an unlatching position, a distal end of the latch member forming a cavity for receiving a portion of the first pin when the rod is in the latched position.

6. The apparatus of claim 1 wherein at least one of the first and second couplers includes a latch member moveable between a latching position and an unlatching position and the inhibiter member includes a rigid member supported by one of the first and second couplers for pivotal movement between the inhibiting and enabling positions.

7. The apparatus of claim 1 wherein the inhibiting member includes a ramp surface located within the pathway when the rod is moving toward the latched position, the first coupler contacting the ramp surface and forcing the inhibitor toward the enabling position as the rod moves toward the latched position.

8. The apparatus of claim 1 wherein the second member is a latch member that is pivotally mounted for movement between a latching position and an unlatching position and wherein gravity tends to force the latch member into the latching position and the inhibiting member is useable to maintain the latch member in the unlatching position.

9. An apparatus for use with an agricultural assembly that includes a wing frame that moves with respect to a support frame, the apparatus for selectively limiting relative movement of the wing frame with respect to the support frame and comprising:
a cylinder assembly including a cylinder and a rod where the rod moves with respect to the cylinder between an unlatched extended position and a latched retracted position, the cylinder assembly including opposite first and second ends at opposite ends of the rod and cylinder, respectively;
a catch member supported at the first end of the cylinder assembly that moves along a pathway as the rod moves toward the retracted position, the catch member forming a first bearing surface;
a latch member including proximal and distal ends, the distal end forming a cavity along a first edge, the latch member linked at the proximal end to the second end of the cylinder assembly for pivotal movement between a latching position and an unlatching position;
an inhibiting member including a rigid member forming a second bearing surface, the inhibiting member mounted for pivotal movement to the distal end of the latch member proximate the cavity for movement between an inhibiting position and an enabling position such that, with the rod in the latched position, when the inhibiting member is in the enabling position, at least a portion of the catch member is received in the cavity and when the inhibiting member is in the enabling position, the second bearing surface bears against the first bearing surface and maintains the catch member outside the cavity;
wherein the latch member also forms a first ramp surface and wherein, when the rod is in the extended position, the first ramp surface is located at least in part in the pathway such that as the rod moves toward the retracted position along at least a portion of the pathway, the catch member contacts the ramp surface and forces the latch member toward the unlatching position until the catch member is aligned with the cavity; wherein the inhibiting member includes a second ramp surface and wherein, when the rod is in the extended position, the second ramp surface is located at least in part in the pathway such that as the rod moves toward the latched position along at least a portion of the pathway, the catch member contacts the second ramp surface and forces the inhibiting member toward the enabling position such that, once the catch member is received within the cavity, the inhibiting member is in the enabling position.

10. The apparatus of claim 9 wherein the latch member is manually rotatable from the latching position to the unlatching position.

11. The apparatus of claim 10 wherein, when the latch member is moved to the unlatching position, the inhibiting member pivots into the inhibiting position to maintain the latch member in the unlatching position until the rod is moved from the latched position.

12. An apparatus for use with an agricultural implement assembly that includes first and second members and a cylinder assembly that includes a cylinder and a rod, each of the first member, second member, cylinder and rod being an assembly component, the cylinder linked to one of the first and second members and the rod linked to the other of the first and second members, the rod moving relative to the cylinder between an unlatched position and a latched position as the one of the members moves with respect to the other of the members between first and second positions, the apparatus for selectively limiting rod movement when the rod is in the second position, the apparatus comprising:
a first coupler supported by one of the assembly components and moving along a pathway as the second member moves from the second position toward the first position;
a second coupler supported at least in part within the pathway by at least another of the assembly components, the second coupler operable to couple with the first is coupler when the rod is in the latched position; and
a latch inhibiting member mounted to one of the assembly components, the inhibiting member proximate at least one of the first and second couplers when the rod is in the latched position and manually moveable between a latch inhibiting position and a latch enabling position, when in the inhibiting position, the inhibiting member inhibiting coupling between the first and second couplers so that rod movement with respect to the cylinder along the pathway is unrestricted by the couplers;
wherein at least one of the first and second couplers includes a latch member and the other of the first and second couplers includes a catch member, the latch member mounted for movement between a latching position and an unlatching position, the latch and catch couplers coupled when the rod is in the latched position and the latch member is in the latching position and decoupled when the latch member is in the unlatched position, the inhibiting member manually operable to support the latch member in the unlatched position when the inhibiting member is in the inhibiting position;
wherein the latch member includes proximal and distal ends and is mounted at the proximal end for pivotal movement, the distal end forming a cavity, when the rod is in the latching position and the inhibiting member is in the enabling position, a first catch member section is received within the cavity to limit extension of the cylinder assembly;
wherein the distal end of the latch member also forms a ramp surface and, as the rod moves toward the latched position, the catch member contacts the ramp surface and forces the latch member toward the unlatching position until the catch member is aligned with the cavity;
wherein the latch member is mounted for pivotal movement about a generally horizontal first axis and the cavity opens downwardly so that gravity tends to force the latch member into the latching position;

wherein the inhibiting member includes a rigid member that is mounted to the distal end of the latch member proximate the cavity for pivotal movement between the inhibiting and enabling positions and the inhibiting member forms a bearing surface that bears against the catch member to maintain the inhibiting member in the inhibiting position when the rod is in the latched position;

wherein the inhibiting member also forms a second ramp surface that resides in the pathway as the rod member moves toward the latched position, the catch member contacting the second ramp surface as the rod moves toward the latched position and forcing the inhibiting member toward the enabling position.

* * * * *